United States Patent [19]

Zajichek

[11] 4,155,068

[45] May 15, 1979

[54] SHIFT LEVER POSITION INDICATOR

[75] Inventor: William J. Zajichek, New Berlin, Wis.

[73] Assignee: Allis-Chalmers Corporation, Milwaukee, Wis.

[21] Appl. No.: 842,793

[22] Filed: Oct. 17, 1977

[51] Int. Cl.² .................... B60Q 1/26; H01H 21/62; H01H 25/00
[52] U.S. Cl. .................................. 340/79; 200/61.88
[58] Field of Search ................ 340/79, 70; 200/61.28, 200/61.88; 116/28 R

[56] References Cited

U.S. PATENT DOCUMENTS

| 3,423,549 | 1/1969 | Sondej | 340/70 |
| 3,437,994 | 4/1969 | Forsberg | 340/70 |
| 4,037,196 | 7/1977 | Atkinson et al. | 340/70 |
| 4,063,217 | 12/1977 | Hyde | 340/70 |

FOREIGN PATENT DOCUMENTS 649023 8/1937 Fed. Rep. of Germany ............. 340/70

Primary Examiner—Donald J. Yusko
Attorney, Agent, or Firm—Arthur L. Nelson

[57] ABSTRACT

A shift lever position indicator for a shift lever which is rotatable on a longitudinal axis and pivotal on a transverse axis to selectively shift a vehicle transmission while the indicator indicates the position of the shift lever and the shifted position of the vehicle transmission.

10 Claims, 9 Drawing Figures

SHIFT LEVER POSITION INDICATOR

This invention relates to a shift lever for a vehicle transmission and more particularly to an indicator for indicating the position of the shift lever and the shifted position of the vehicle transmission in response to rotation and pivotal movement of the shift lever on the vehicle.

Conventional shift levers for vehicle transmissions normally shift through a selected pattern such as a double "H" pattern for confining the movement of the shift lever as the vehicle transmission is shifted. Since the shift lever pivotally moves through the double "H" pattern formed in a gate plate of the control console, it is apparent which position the shift lever and the transmission is in during the normal shifting operation. This invention relates to an indicator for a shift lever which operates to rotate about a longitudinal axis of the lever for selecting a gear ratio and pivots about an axis transverse to the longitudinal axis of the shift lever to selectively shift the vehicle transmission. The shift lever, however, pivots in a single slot of a gate plate to selectively shift the vehicle transmission through a selected number of gear ratios. Since it is not readily apparent from the shift lever, the position of the shift lever and the shifted position of the transmission, a shift lever position indicator is provided in combination with the shift lever and shifting mechanism. Accordingly, the indicator may be provided on the gate plate of the control console for the shift lever, the instrument panel of the vehicle, or any suitable location to selectively indicate the selected position of the shift lever and also the shifted position of the vehicle transmission.

Accordingly, it is an object of this invention to provide a shift lever position indicator in connection with the shift lever for a transmission.

It is another object of this invention to provide a mechanical shift lever indicator providing a pattern on the gate plate to show the vehicle transmission shift position as the shift lever is shifted.

It is a further object of this invention to provide an electrical shift lever indicator having a lighted panel to indicate the transmission shift position responsive to the shift lever position.

It is a further object of this invention to provide a shift lever position indicator responsive to the rotational and pivotal movement of the shift lever in shifting a vehicle transmission.

The objects of this invention are accomplished with a vehicle shift lever which is pivotally mounted for pivotal movement fore and aft on an axis normal to the longitudinal axis of the lever. The lever is also rotatably supported for rotation on an axis longitudinal of the lever. The lever is rotatable to selectively engage a shift rail in the vehicle transmission. As the lever is pivoted fore and aft, the shift rail is reciprocated in the transmission to shift the transmission to the selected gear ratio. The indicator includes an arm on the shift lever which moves transversely and then fore and aft in generally a double "H" pattern. The shift lever position is indicated by the movement of the shift lever in shifting of the transmission. The indicator may include a gate plate having a double "H" pattern to mechanically indicate the position of the shift lever or electrical contacts selectively closed by movement of the shift lever with an electrical circuit to selectively illuminate lights on a control panel for indicating to the operator the selected position of the shift lever and the selected gear ratio of the vehicle transmission.

Accordingly the preferred embodiments of this invention are illustrated in the attached drawings.

Figure 1:
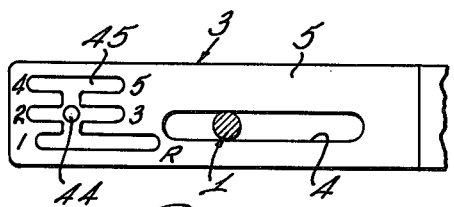
FIG. 1 is a view of the control console as viewed on line I—I of FIG. 2.
Figure 2:
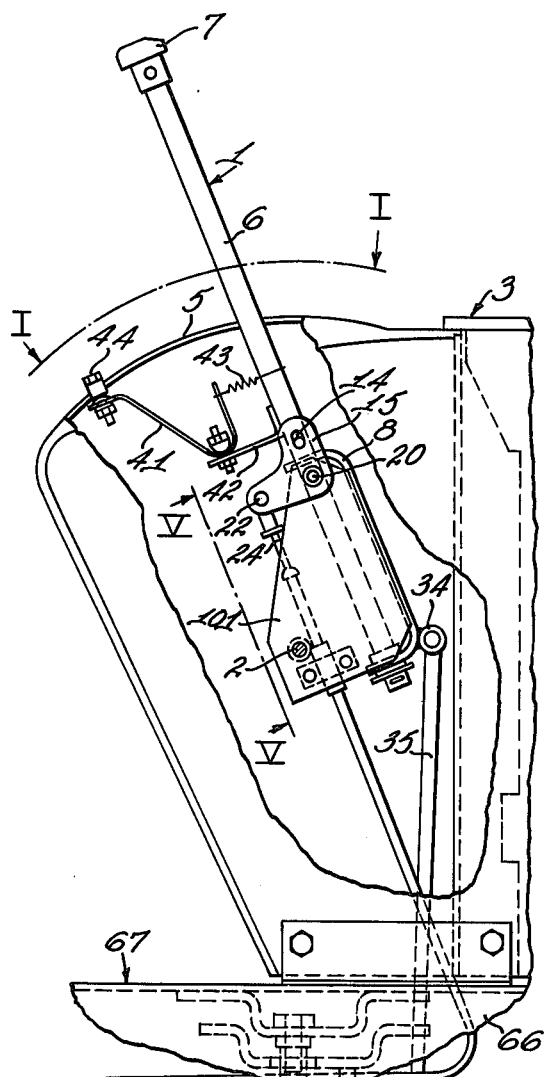
FIG. 2 is a partially sectioned side elevation view of the control console and shift lever.
Figures 5, 6:
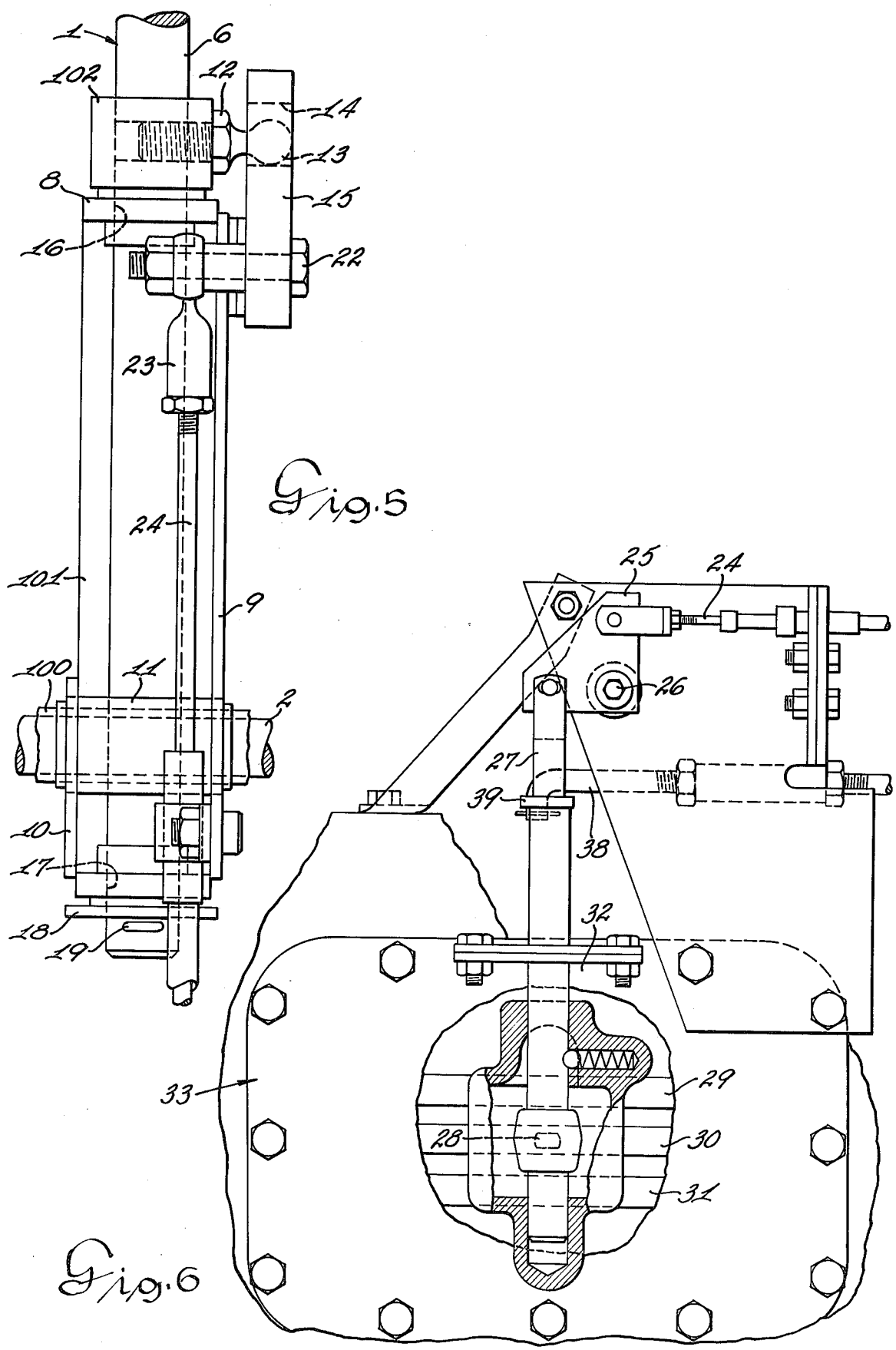
FIG. 5 is a view taken on line V—V of FIG. 2 of the control console.
FIG. 6 illustrates a partially sectioned plan view of the shift mechanism connected between the shift lever and the shift rails.
Figure 7:
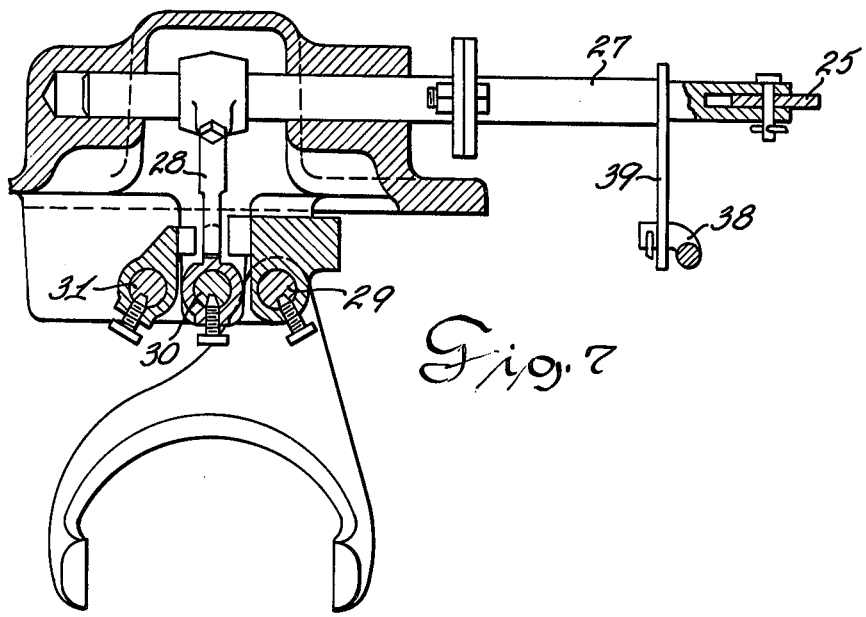
FIG. 7 is a cross-sectioned view showing an end view of the shift rails and the portion of the shifting mechanism.

Referring to the drawings, the preferred embodiments of this invention are illustrated. FIGS. 1 and 2 illustrate the mechanical version of the shift lever position indicator. The shift lever 1 is pivotally supported on the bolt 2 mounted in the control console 3. The lever 1 pivots fore and aft in the slot 4 of the gate plate 5 of the control console 3. FIG. 5 is an enlarged view of the lever shown in FIG. 2. The lever includes the rod 6 and handle 7. The rod 6 is mounted for rotational movement in the base 101 formed by the channel 8 which is fabricated to the plates 9 and 10 which carry the sleeve 11 and bushing 100. The bushing 100 embraces the bolt 2 and pivotally supports the lever 1. The rod 6 carries the sleeve 102 and bolt 12 having a spherical head 13 received in the slot 14 of the bellcrank 15. The rod 6 is rotatable in openings 16 and 17 of the channel 8. The washer 18 and pin 19 limit axial movement of the rod 6 in the channel 8.

Rotational movement of the handle 7 of lever 1 causes the bellcrank 15 to pivot upon its supporting pin 20 pivoting of the bellcrank 15 which lifts the pivotal connection including the bolt 22 and connector 23 to reciprocate the cable 24. Reciprocation of the cable 24 causes a lever 25 to pivot on its pivot pin 26 to operate the selector rod 27 and selector 28. Reciprocal movement of the cable 24 causes the shift rod 27 with selector 28 to selectively engage one of the shift rails 29, 30 or 31. The selection of the shift rail is accomplished by a reciprocal movement on the selector 28 selectively engaging one of the shift rails. The shift selector rod 27 is mounted on housing 32 of the vehicle transmission 33.

When the shift lever 1 is pivoted on the bolt 2, the bearing 34 on the base 101 which is pivotally connected to the link 35 pivots the bellcrank 36 which is pivotally mounted on the chassis 66. Bellcrank 36 has an arm 37 which is pivotally connected to the pushrod 38. The push rod 38 is pivotally connected to the arm 39 of the shift selector rod 27. The shift selector rod 27 selectively reciprocates the shift rails 29, 30 or 31.

Accordingly, the shift lever is rotated to select the shift rail and the shift lever is then pivoted fore and aft to selectively shift to the desired gear ratio in the transmission. During this movement of the lever, the indicator arm 41 as shown in FIG. 2 rotates with the support 42 on lever 1. The spring 43 biases the indicator arm 41 in the direction of the movement of the support arm 42 although the angular rotation is less than the angular rotation of the shift lever 1. The indicator arm carries an indicator button 44 which is fastened to the end of the indicator arm 41 and moves through the double "H" pattern 45 indicated on the gate plate 5. The shifted positions are indicated on the gate plate and when the shift lever is in the shifted position, as indicated on the gate plate, the transmission is shifted into the indicated gear ratio. Since the indicator arm 41 is resilient, the indicator button 44 does not travel the equal distance as the lever 1. The transverse movement of the button is also of reduced angular displacement because of the spring 43 which biases the indicator arm in the same direction of rotation as the support arm 42 but is not required to move an equal distance if the spring 43 was not used.

Figure 3:
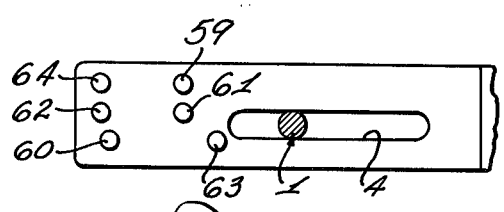
FIG. 3 is a view taken on line III—III of FIG. 4 illustrating the control console.
Figure 4:
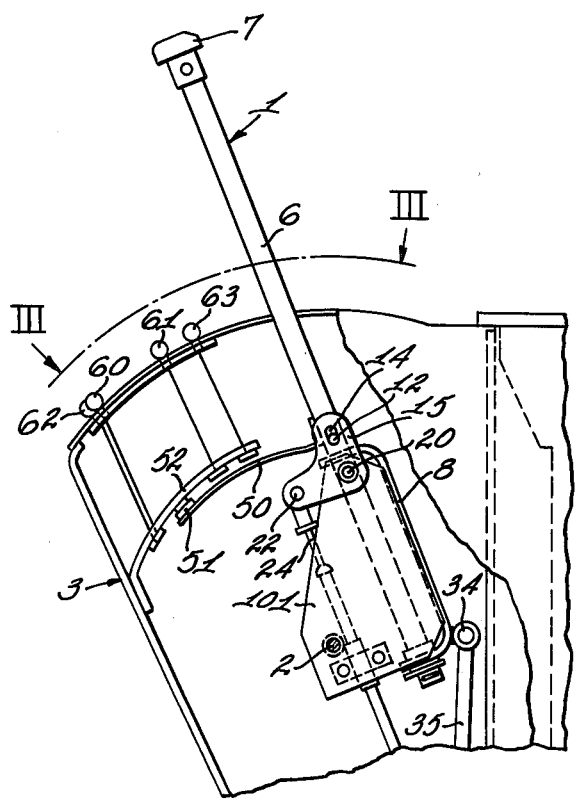
FIG. 4 is a side elevation view partially in section illustrating an electrical version of the shift lever position indicator on the control console.

FIGS. 3 and 4 illustrate the electrical version of the shift lever position indicator. The wiper arm 50 is fastened to the shift lever 1 and carries a contact 51. The contact board 52 which is supported on the control console 3 and has an arcuate curvature in conformity with the radius of curvature from the pivot point of the pivotal axis formed by bolt 2. The contact 51 of shift lever 1 is at ground potential and as the wiper arm 50 is in contact with one of the contacts 53, 54, 55, 56, 57 or 58, it completes the circuit to illuminate the mating bulbs on the shift lever position indicator.

Figure 8:
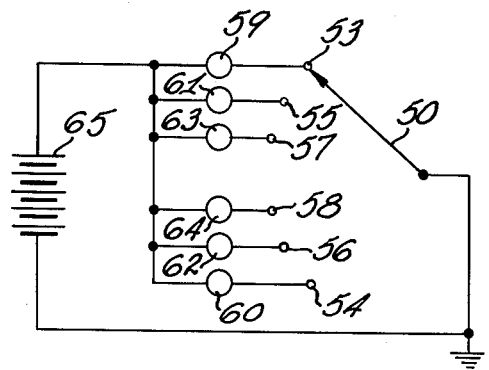
FIG. 8 is an electrical circuit for use in the electrical version of the shift lever position indicator.

Each contact is connected to a mating bulb 59, 60, 61, 62, 63 or 64. The six bulbs are in parallel connection in the circuit and only one bulb can be illuminated at a time. The bulbs are shown in FIG. 3 connected immediately over the contact shown in FIG. 9. The electrical circuit is shown in FIG. 8 in which the bulbs are selectively connected to the contact 51 on wiper arm 50. The battery 65 is connected between ground and parallel connection of the bulbs as indicated. The wiper arm selectively completes the circuit through one of the six bulbs to ground.

FIG. 3 illustrates the indicator on the control console for the shift lever 1. The control console 3 is mounted on the platform 66 of the vehicle chassis of the vehicle 67.

Figure 9:
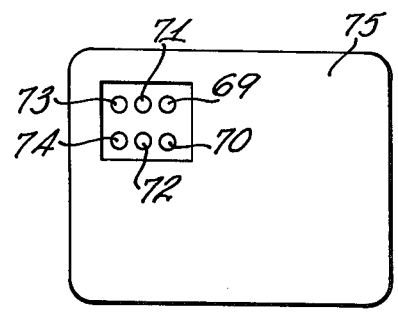
FIG. 9 illustrates the indicator lights positioned on the instrument panel.

FIG. 9 illustrates the bulbs 69, 70, 71, 72, 73 and 74 mounted on the instrument panel 75. The position of the indicator can be adapted to any convenient location as desired.

The operation of the shift lever position indicator will be described in the following paragraphs.

The shift lever 1 is pivotally mounted in the control console 3 of the vehicle 67. The shift lever 1 can be rotated on its longitudinal axis to selectively operate the bellcrank 15. Pivotal movement of the bellcrank lifts and lowers the cable 24 which selects the shift rail 29, 30 or 31. Pivotal movement of the shift lever 1 fore and aft selectively engages the desired gear ratio. The indicator arm 41 moves transversely to position the indicator button 44 in the selected position of the double "H" pattern 45 and reciprocate the button longitudinally in the selected slots of the double "H" pattern 45 as the shift lever 1 is pivoted fore and aft.

Referring to FIGS. 3 and 4, as the shift lever 1 is rotated on its axis to selectively engage one of the shift rails 29, 30 and 31, the wiper arm 50 pivots transversely to selectively move to a position aligning itself intermediate between the contacts. As the shift lever is pivoted fore and aft, it selectively engages one of the contacts thereby completing one of the circuits as shown in FIG. 8. When the shift lever is completely in the foreward or rearward position, the contact 51 engages one of the contacts 53, 54, 55, 56, 57 or 58. The indicator light showing the position of the shift lever is lighted and remains lighted until the shift lever is shifted from this position. In the neutral position, no light is showing on the indicator panel.

The bulbs and contacts are correlated in the circuit to indicate the position of the shift rail and also the position of the shifting mechanism in the vehicle transmission.

Whether the mechanical shift lever position indicator is used or the electrical shift rail position is used, the operation is essentially the same. The indicator arm or wiper arm pivots with the lever to selectively move the indicator button or the contact in the indicating position. Either the button 44 or a lighted bulb will show the operator the position of the shift lever and the position in which the transmission is shifted.

The embodiment of the invention in which an exclusive property of privilege is claimed are defined as follows:

1. A shift lever position indicator comprising a shift lever, means rotatably supporting said shift lever for rotation on a longitudinal axis, means pivotally supporting said lever for pivoting on a transverse axis, a shifting mechanism connected to said shift lever for shifting a transmission responsive to rotational and pivotal movement of said shift lever, an indicator member extending from said lever, an indicator panel for selectively indicating one of a plurality of shift lever positions on said panel, an indicator means connected between said indicator member and said indicator panel transmitting the shift lever position and defining a pattern on said panel having a width responsive to the rotational movement of said shift lever about its longitudinal axis and a length responsive to the pivotal movement of said shift lever about is transverse axis.

2. A shift lever position indicator as set forth in claim 1 wherein said indicator member defines an arm extending radially from said lever.

3. A shift lever position indicator as set forth in claim 1 wherein a control console defines said means pivotally supporting said lever on the transverse axis, a gate plate defining a shifting pattern for said shift lever and said indicator panel.

4. A shift lever position indicator as set forth in claim 1 wherein said indicator member includes a wiper arm having an electrical contact, a circuit board having a plurality of contacts each representing a position of said shift lever, an electrical circuit including bulbs lighted in response to the positioning of said shift lever for engaging said wiper arm contact with one of the contacts on said contact board for illuminating a light on the indicator panel.

5. A shift lever position indicator as set forth in claim 1 wherein said means pivotally supporting said lever define a control console.

6. A shift lever position indicator as set forth in claim 1 wherein said indicator member defines an arm extending radially from said shift lever, a control console defining said means for pivotally supporting said lever, a gate plate on said control console defining a pivotal slot for pivoting said shift lever fore and aft, said gate plate defining a double "H" pattern for selective positioning of said indicator element on said indicator arm for defining the shift lever position on said indicator panel.

7. A shift lever position indicator as set forth in claim 1 wherein said indicator member defines a wiper arm mounted on said shift lever and extending radially therefrom and having a contact, a plurality of electrical contacts, a circuit board supporting said plurality of electrical contacts for selective engagement with the contact on said wiper arm, an electrical circuit including electrical bulbs and said contacts for selectively indicating the selected position of said shift lever responsive to movement of the shift lever.

8. A shift lever position indicator as set forth in claim 1 wherein said indicator member defines a radial arm connected to said shift lever, a control console including said means pivotally supporting said shift lever, a gate plate defining a double "H" pattern for receiving an indicator button supported on said arm, said indicator button selectively moving through said double "H" pattern to selectively indicate the position of said shift lever as said shift lever is moved.

9. A shift lever position indicator as set forth in claim 1 including a control console defining said means pivotally supporting said shift lever, said indicator member defining an arm mounted on said shift lever and extending radially therefrom and carrying an indicator button, a gate plate on said control console defining a double "H" pattern receiving said indicator button to selectively indicate the respective position of said shift lever on said indicator panel.

10. A shift lever position indicator as set forth in claim 1 including a control console defining said means pivotally supporting said lever, said indicator member including an arm having an indicator button, a gate plate on said control console defining a longitudinal slot confining the pivotal movement of said lever, said gate plate defining three parallel slots connected by a transverse slot to define a double "H" pattern, said shift lever selectively rotated clockwise and counterclockwise to selectively position said button in one of said three parallel slots, said shift lever selectively pivoting fore and aft to position said indicator button in the extreme end of one of said selected slots to thereby indicate the shifted position of said shift lever.

* * * * *